(12) United States Patent
Ivansons et al.

(10) Patent No.: US 8,066,269 B2
(45) Date of Patent: Nov. 29, 2011

(54) CLAMP LOCKING MECHANISM IN DEVICE FOR WELDING PLASTIC TUBES

(75) Inventors: Ivars V. Ivansons, Elkton, MD (US); Dudley W. C. Spencer, Wilmington, DE (US)

(73) Assignee: Genesis BPS, LLC, Hackensack, NJ (US)

( * ) Notice: Subject to any disclaimer, the term of this patent is extended or adjusted under 35 U.S.C. 154(b) by 146 days.

(21) Appl. No.: 12/488,822

(22) Filed: Jun. 22, 2009

(65) Prior Publication Data

US 2010/0320669 A1 Dec. 23, 2010

(51) Int. Cl.
*B23Q 3/18* (2006.01)

(52) U.S. Cl. ............... 269/152; 269/254 CS; 269/74; 269/314

(58) Field of Classification Search ............... 269/152, 269/43, 254 CS, 58, 74, 309–310, 313–314; 156/499
See application file for complete search history.

(56) References Cited

U.S. PATENT DOCUMENTS

| | | |
|---|---|---|
| 4,610,670 A | 9/1986 | Spencer |
| 4,619,642 A | 10/1986 | Spencer |
| 4,770,735 A | 9/1988 | Shaposka |
| 4,793,880 A | 12/1988 | Shaposka |
| 4,832,773 A | 5/1989 | Shaposka |
| 4,864,101 A | 9/1989 | Shaposka |
| 4,897,138 A | 1/1990 | Shaposka |
| 4,913,756 A | 4/1990 | Shaposka |
| 4,929,293 A | 5/1990 | Osgar |
| 4,933,036 A | 6/1990 | Shaposka |
| 5,141,592 A | 8/1992 | Shaposka |
| 5,156,701 A | 10/1992 | Spencer |
| 5,158,630 A | 10/1992 | Shaposka |
| 5,209,800 A | 5/1993 | Spencer |
| 5,244,522 A | 9/1993 | Spencer |
| 5,248,359 A | 9/1993 | Shaposka |
| 5,256,229 A | 10/1993 | Spencer |
| 5,279,685 A | 1/1994 | Ivansons |
| 5,397,425 A | 3/1995 | Ivansons |
| 5,525,186 A | 6/1996 | Ivansons |
| 5,632,852 A | 5/1997 | Ivansons |
| 5,674,333 A | 10/1997 | Spencer |
| 5,855,731 A | 1/1999 | Spencer |
| 5,871,612 A | 2/1999 | Spencer |
| 5,906,365 A * | 5/1999 | Wu ................................ 269/43 |
| 6,020,574 A | 2/2000 | Ivansons |
| 6,132,833 A | 10/2000 | Spencer |
| 6,177,652 B1 | 1/2001 | Ivansons |
| 6,244,580 B1 * | 6/2001 | Durfee, Jr. ..................... 269/43 |
| 6,341,637 B1 | 1/2002 | Yamada |
| 6,360,415 B1 * | 3/2002 | Wada et al. .................. 29/283.5 |
| 6,361,034 B1 * | 3/2002 | Wolfe ............................. 269/8 |
| 6,378,187 B1 * | 4/2002 | Walker ........................ 29/281.5 |
| 6,460,592 B1 | 10/2002 | Sano |
| 6,463,979 B1 | 10/2002 | Sano |

(Continued)

*Primary Examiner* — Lee D Wilson
(74) *Attorney, Agent, or Firm* — SNR Denton US LLP (57) ABSTRACT

A device for welding plastic tubes includes a laterally movable tube holder having tube holding areas and a laterally fixed tube holder having tube holding areas. Each tube holder includes clamping structure for clamping each tube placed in the respective tube holder areas and for creating a fluid free area. A spring mechanism urges the laterally movable tube holder toward the laterally fixed tube holder to maintain the clamp faces flush against each other. A clamp locking mechanism is provided to supplement the action of the spring mechanism by maintaining the clamp faces flush against each other during the loading of the tubes.

19 Claims, 5 Drawing Sheets

U.S. PATENT DOCUMENTS

| | | |
|---|---|---|
| 6,637,489 B1 | 10/2003 | Spencer |
| 6,913,056 B2 | 7/2005 | Landherr |
| 6,926,189 B2 | 8/2005 | Shanks |
| 7,398,813 B2 * | 7/2008 | Ivansons et al. .............. 156/499 |
| 7,762,534 B2 * | 7/2010 | Ouellette et al. ................ 269/32 |
| 7,857,296 B2 * | 12/2010 | Lu et al. ........................ 269/315 |
| 2010/0320669 A1 * | 12/2010 | Ivansons ....................... 269/152 |

* cited by examiner

CLAMP LOCKING MECHANISM IN DEVICE FOR WELDING PLASTIC TUBES

BACKGROUND OF THE INVENTION

Various techniques have been used for welding plastic tubes particularly as used in the medical field. U.S. Pat. No. 7,398,813 describes a device having a first tube holder and a second tube holder. Each of the tube holders has first and second parallel tube holding areas in line with each other. In practice a first tube would be placed in the aligned first tube holding areas across the location where the tube holders are adjacent each other. A second tube would be similarly placed in the aligned second tube holding areas. A tube clamp in each of the first tube holding areas clamps the first tube to create a generally fluid free area of the first tube. A tube clamp is similarly provided in the second tube holding areas to create a generally fluid free area of the second tube. One of the tube holders is laterally movable while the clamps are maintained in their clamping condition. To increase the length of the fluid free area, the laterally movable tube holder is laterally shifted while the clamps are closed. Such movement is performed after the tubes are initially loaded in a loading station, and when the tube holders are in a stripping station. Thereafter, the tubes are cut. In U.S. Pat. No. 7,398,813 the cutting is done with a non-heated cutting device, such as a cold blade, and the tube holders are then moved to a heating station while the clamps are still maintained in their clamping condition, In the heating station a heating device heats/melts the cut stub ends of the tubes. The cut ends of the tubes are realigned so that a cut stub end of the first tube becomes aligned with a cut stub end of the second tube and these two aligned heated/melted cut stub ends are then shifted into contact with each other to become welded together.

When the clamps are being closed in the loading station, the movable tube holder is forced against the fixed tube holder by a spring. The welding device of U.S. Pat. No. 7,398,813 works effectively where the tubing used is within the specific tube thickness for which the clamps were sized. If, however, a tubing of greater tube thickness is used, the spring force may not be sufficient to keep the clamp faces flush when the tubing is compressed during loading. Instead, the extra material of the thick tubing may become expressed out from the clamp faces and cause separation of the spring loaded clamps. This could trap fluid between the clamp faces. In such circumstance this would defeat the purpose of the later stripping process and could create conditions for weak welds.

SUMMARY OF THE INVENTION

An object of this invention is to provide a device for welding plastic tubes of the above type which accommodates a wider range of tubing thickness.

A further object of this invention is to provide such a device which incorporates a clamp locking mechanism which in cooperation with the spring effectively maintains the clamp faces flush when the tubing is compressed during loading.

In accordance with this invention the clamp locking mechanism includes a manually operated lever arm which is movable to one of two positions. In one position the lever arm causes a pivot arm to rotate toward the movable tube holder and the tip of the pivot arm pushes against a cam roller shaft on the movable tube holder to lock the movable tube holder in place flush against the fixed tube holder.

The clamp locking mechanism may include a handle mounted on the lever arm shaft to facilitate the movement of the lever arm. A support bracket mounted to a cam roller guide block prevents the lever arm from moving backwards when the tube clamps are under compressive loads and are pushing against the pivot arm.

A clamp lock position sensor may be mounted to the support bracket to sense when the lever arm is in its intended up and down positions.

DETAILED DESCRIPTION

The present invention is directed to devices for welding plastic tubes, such as disclosed in U.S. Pat. No. 7,398,813 and in the patents referred to in column 1 of U.S. Pat. No. 7,398,813. All of the details of U.S. Pat. No. 7,398,813 and the other patents referred to therein are incorporated herein by reference thereto.

Figure 1:
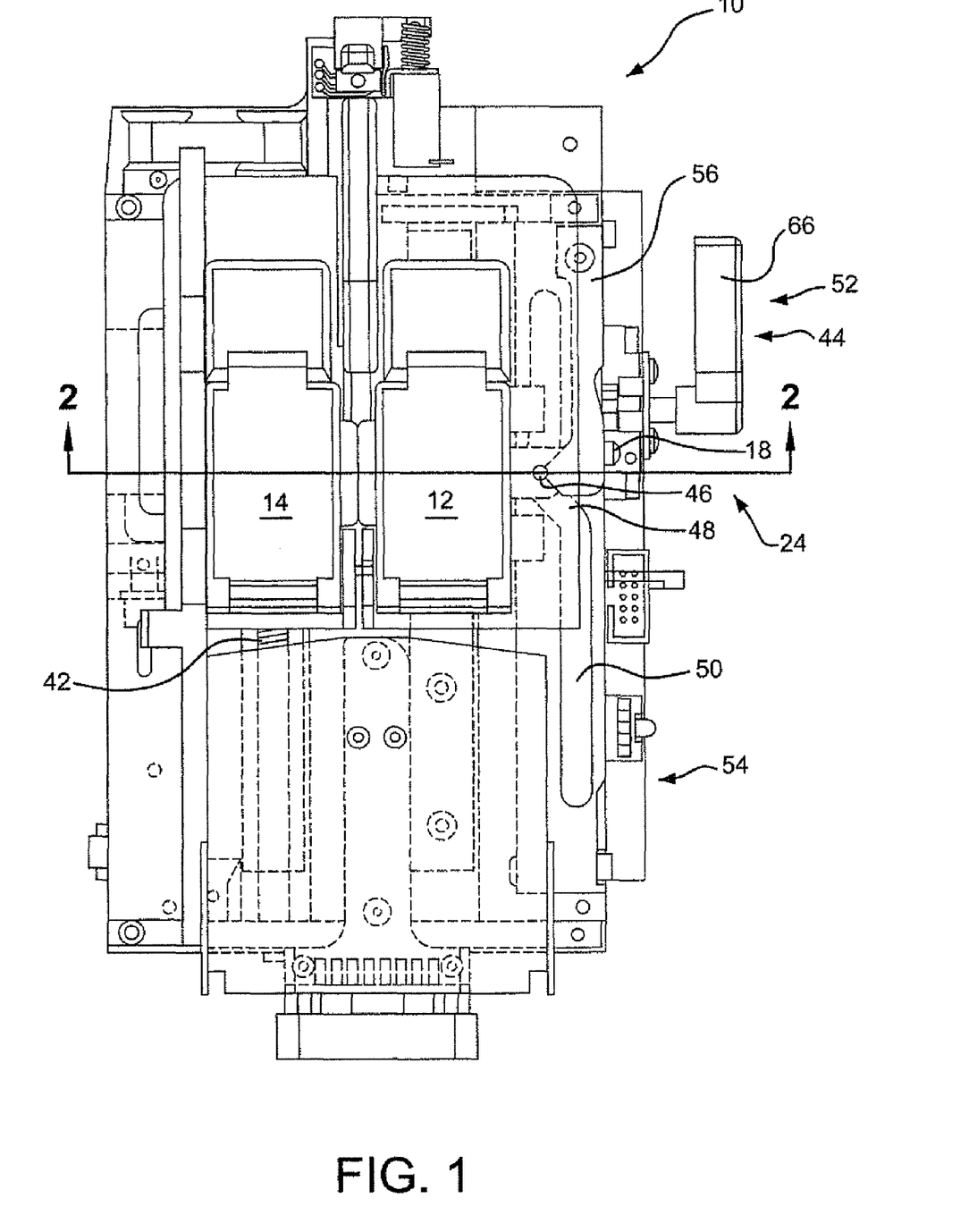
FIG. 1 is a top plan view of a device for welding plastic tubes in accordance with this invention.
Figure 2:
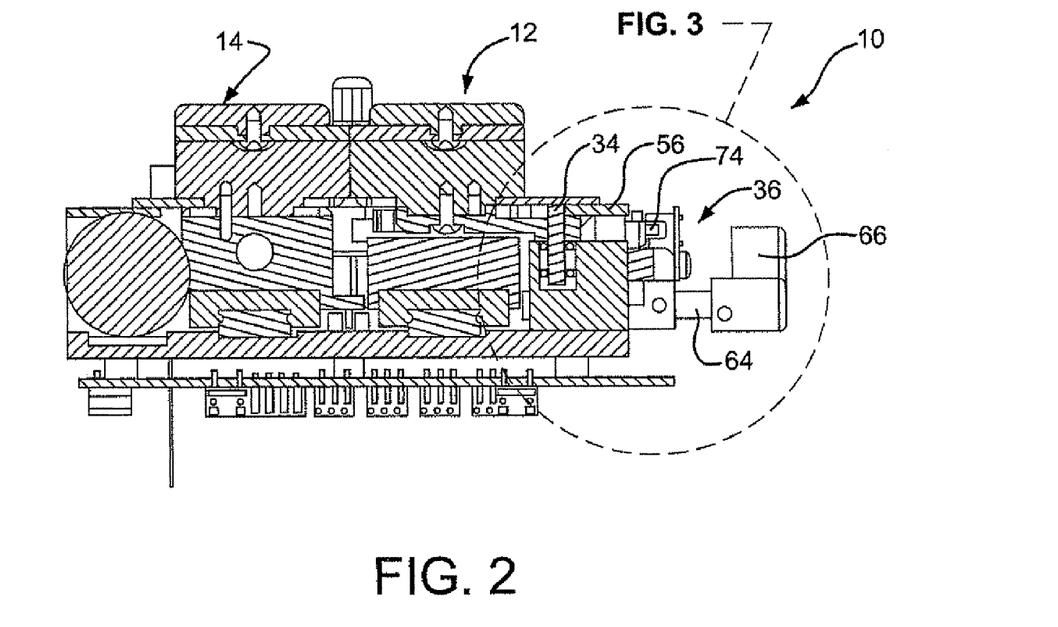
FIG. 2 is a cross sectional view in elevation taken through FIG. 1 along the line 2-2.
Figure 3:
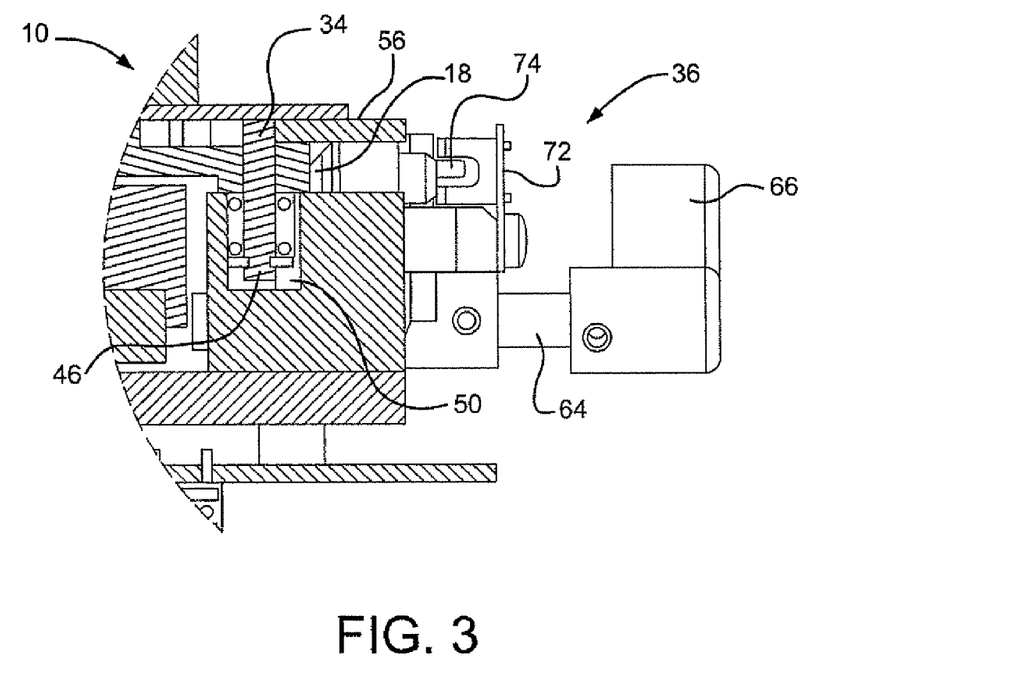
FIG. 3 is an enlarged view of the circled portion of FIG. 2.

FIGS. 1-3 and 6 illustrate a device 10 for welding plastic tubes. As shown in FIG. 1 device 10 includes a first tube holder 12 and a second tube holder 14. Tube holder 12 includes first tube holding area 16 (FIG. 6) and a parallel second tube holding area. The tube holding areas may be grooves extending across the tube holder. Similarly, second tube holder 14 includes first tube holding area 20 and second tube holding area which is parallel to tube holding area 20. These tube holding areas may also be grooves. The spacing between the tube holder areas in the tube holder 12 is the same as the spacing between tube holding areas in tube holder 14.

Figure 6:
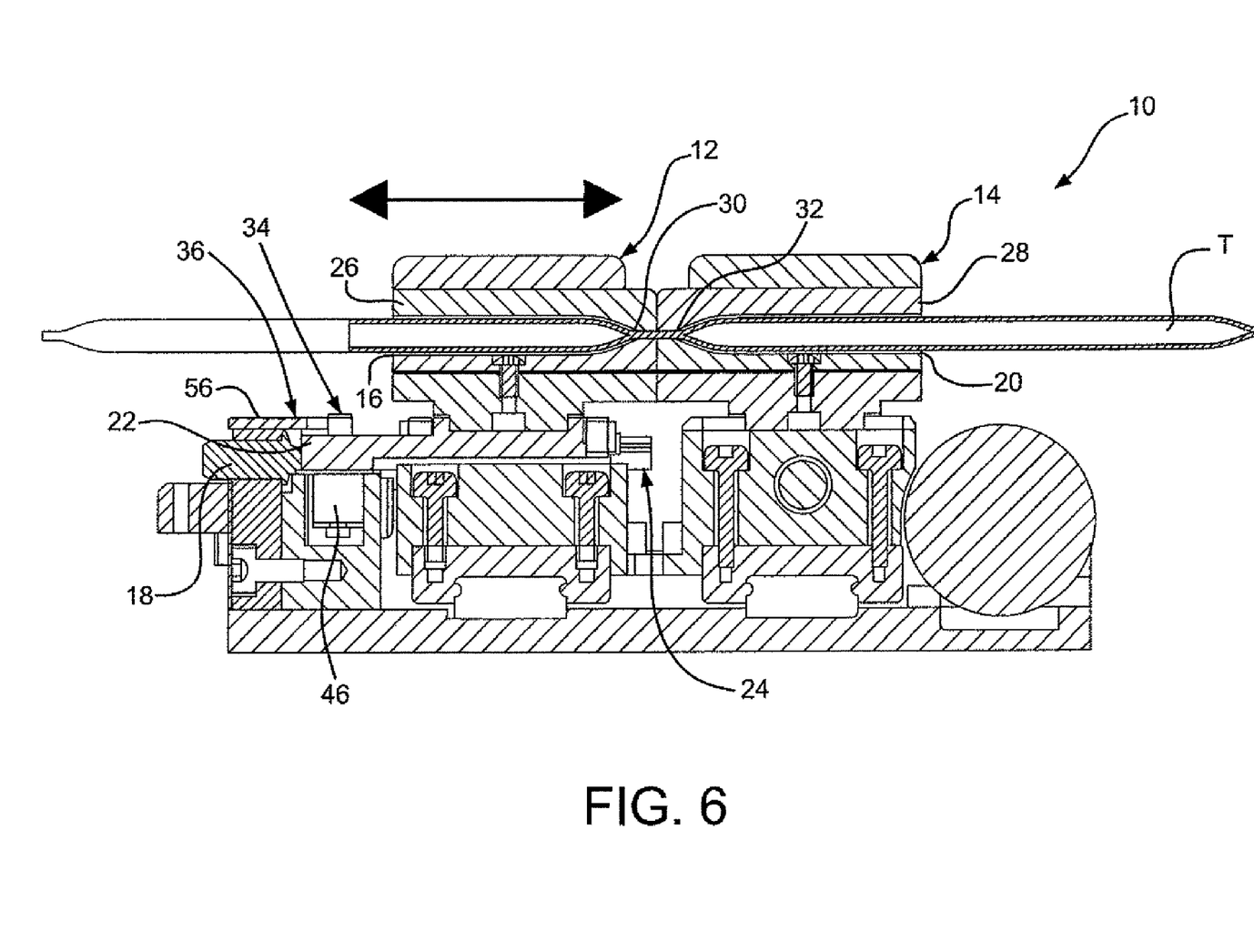
FIG. 6 is a cross-sectional view similar to FIG. 2 showing tubing mounted in the welding device.

FIG. 1 illustrates the tube holders 12 and 14 in the loading station 24 of the device 10. As shown in FIG. 6, while in the loading station, a first tube T is inserted in tube holding area 16 of tube holder 12 and in the aligned tube holding area 20 of tube holder 14. Similarly, a second tube is inserted in the aligned second tube holding of the tube holder 12 and 14. While in these tube holding areas the tubes are clamped and held in position in each tube holder.

After the tubes are clamped in place in the loading station 24, the tube holders 12,14 are jointly moved longitudinally by any suitable structure such as screw 42 away from the loading station 24. Such movement is controlled by cam operation. FIG. 1 illustrates a cam track 50 with two straight portions joined by curved or bent portion 48. Cam 46 on its shaft 34 rides in track 50. The tube holders 12, 14 carrying the clamped tubes are moved together in a longitudinal direction to a stripping station 44. The cam has a slight outward bend 48 in the track 50 that spreads the tube holders 12,14 apart at the stripping station stripping the fluid from the tubes prior to reaching a cutting blade in the cutting station 52. The carriage carrying the tube holders then reverses direction and the carriage and tube holders move completely up to the outer end of the track 50 to the heating/melting station 54. The cam 46 has a large ramp that separates the tube holders to allow them to clear the infra-red heater coil and sets up the proper distance for melting. Once the melting is finished the tube holders 12,14 reverse direction and head back towards the original loading station 24 which is now the welding station. Upon passing the bend 48 the tube holders shift toward each other. One of the tube holders is held in place while the other tube holder is allowed to move longitudinally and realign the tube ends so that the two tube lines will be welded together when the clamps close laterally back together as they move past the large ramp or bend 48 to the welding station.

The description indicated above generally relates to steps which are also performed in the procedures described in U.S. Pat. No. 7,398,813.

As shown in FIG. 6 a ball spring plunger 18 reacts against the base 22 of first tube holder 12. As shown by the double headed arrow, tube holder 12 is laterally movable. Each tube holder includes a hinged clamp 26,28 which has a flat surface but terminates in a downwardly extending jaw 30,32. When the clamps 26,28 are closed upon the tubing, the clamp jaws 30,32 flatten the tubing and create a dry area which will be the area that is later cut prior to the realigning and the welding of the tubing sections. As previously noted this type of arrangement in a welding device such as disclosed in U.S. Pat. No. 7,398,813 works effectively to laterally press the inner face of tube holder 12 against the inner face of tube holder 14 so that the vertical face of clamp jaw 30 is against the vertical face of clamp jaw 32. These clamp faces are held together by the fixed spring force which is applied to the clamps of tube holder 12 through the ball spring plunger 18 when the clamps are in the loading position in loading station 24. This spring force holds the clamp faces together as the tubing is compressed when the tube clamps 26,28 are closed and latched in a known manner. The clamps with their tube holders would then be moved to the stripping station 44 where the linear cam and roller 46 in track 50 pull the tube holders apart.

The ball spring plunger 18 provides sufficient force to keep the tubing together in a compressed condition as long as the tubing used is within a specific tube thickness for which the clamps were sized. If a tubing of greater tube thickness than that for which the clamps were specifically designed is used, then the spring force may not be sufficient enough to keep the clamp faces flush when the tubing is compressed during loading. The extra material of a thick tube will be expressed out from the clamp faces and separate the spring loaded clamps. This could trap fluid between the clamp faces defeating the purpose of the stripping process and creating condition for weld leaks.

The present invention incorporates a clamp locking mechanism 36 to hold the clamps together during tube loading as well as to allow the clamps to accommodate a wider range of tubing thickness. The clamp locking mechanism 36 will also insure that no fluid will be trapped between the clamps prior to stripping. Thus, in conditions where the tubes are too thick, the clamp locking mechanism 36 will provide an additional force to supplement the force of the spring 18 and thereby prevent the movable tube holder 12 from moving away from the fixed tube holder 14.

Figure 4:
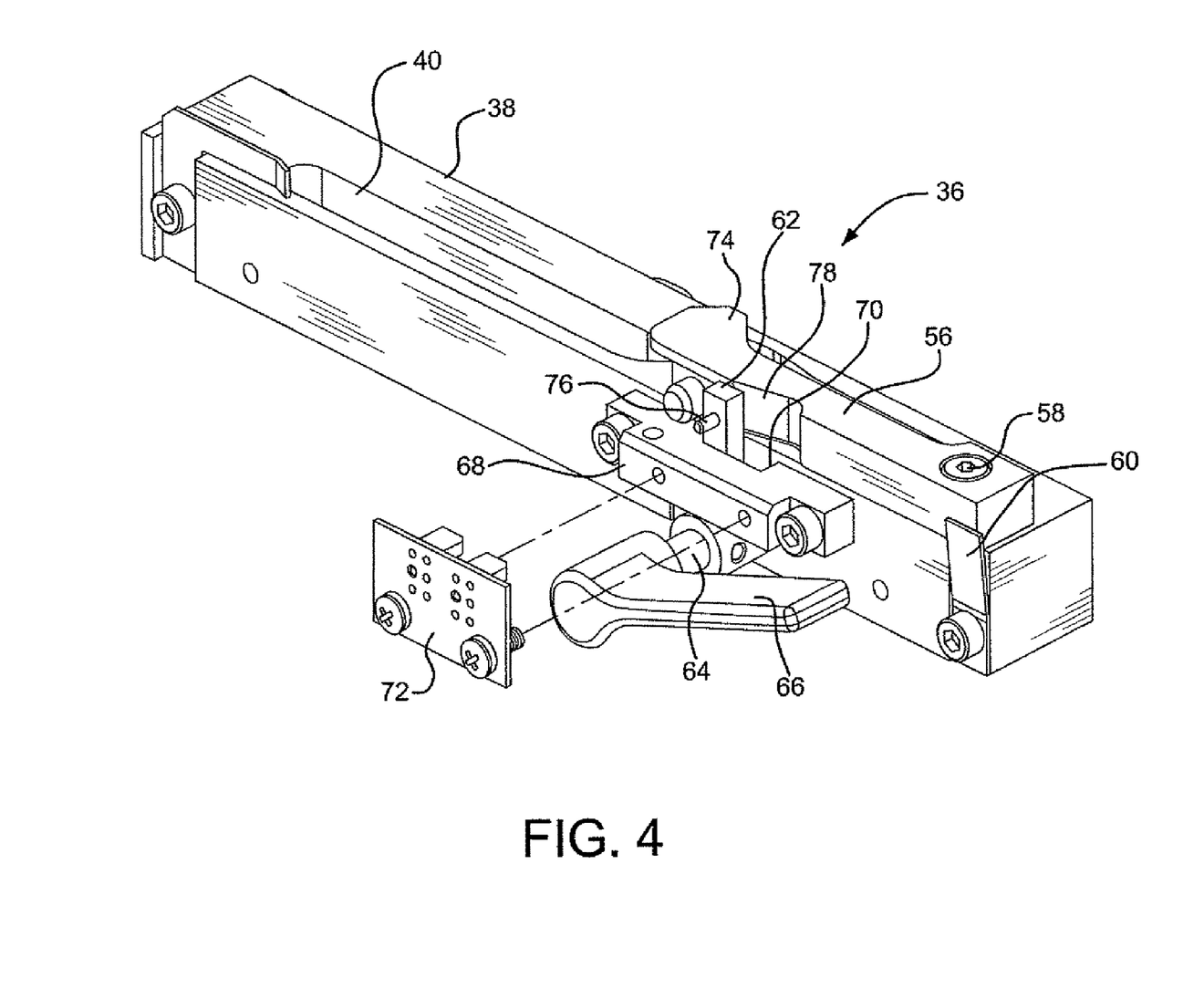
FIG. 4 is a perspective view showing the clamp locking mechanism of this invention in one position of operation.
Figure 5:
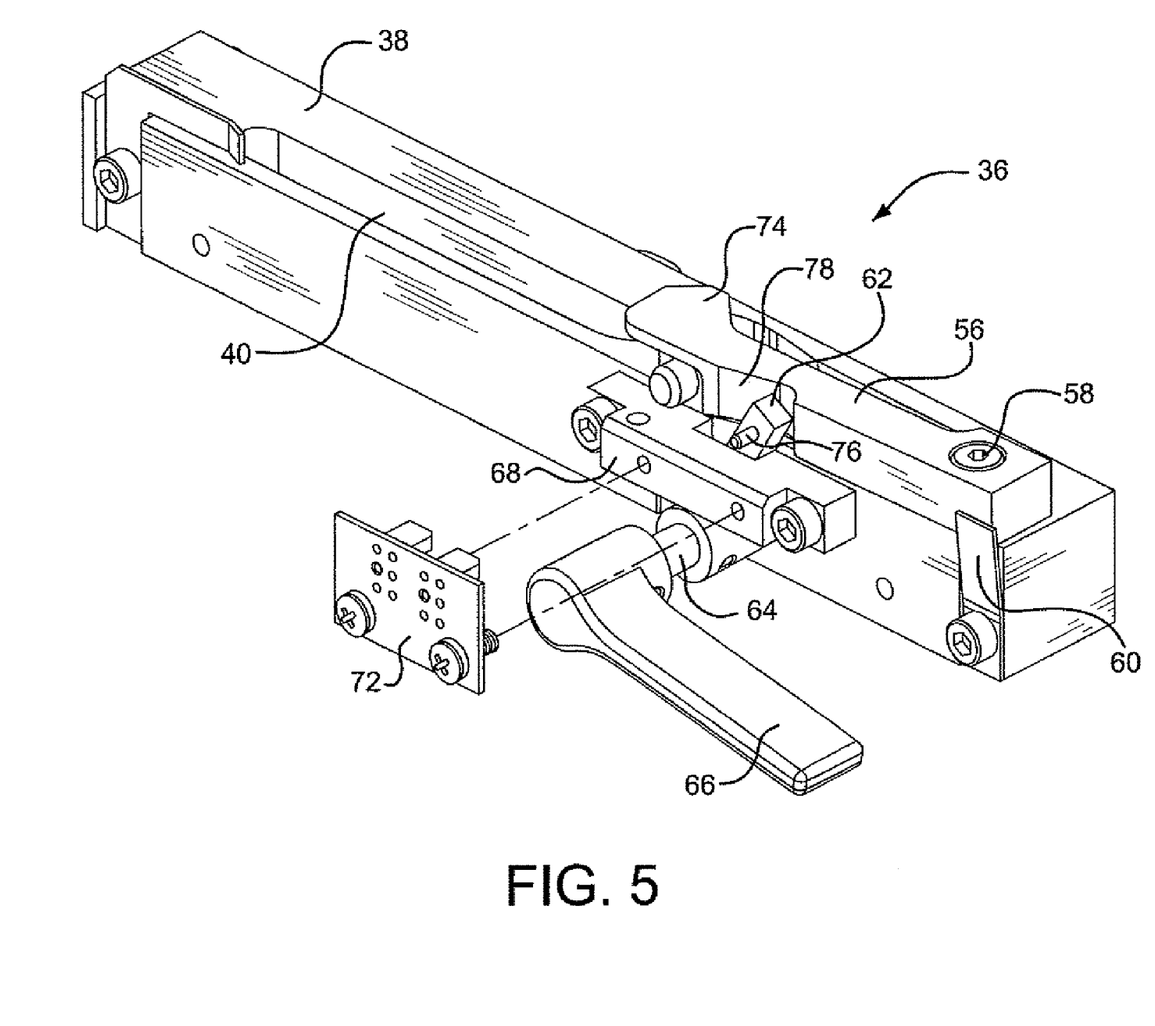
FIG. 5 is a perspective view similar to FIG. 4 showing the clamp locking mechanism in its second position of operation.

FIGS. 4-5 illustrate the details of the clamp locking mechanism 32. As shown, the clamp locking mechanism 36 includes a block 38 which would be mounted on an upper surface of device 10 having a cam roller track 40 which provides a cam follower track for driving the laterally movable tube holder 12. A pivot arm 56 is mounted to block 38 and has its pivot point at pivot pin 58 near one end of block 38. A pivot arm leaf spring 60 provides a spring force to urge the pivot arm 56 in a counterclockwise direction which would keep the pivot arm in the open retracted position shown in FIG. 5.

A lever arm 62 is mounted on lever arm shaft 64 which is rotatably connected to block 38. A clamp lock handle 66 is mounted to one end of shaft 64 so that the manual movement of the handle 66 controls the position of lever arm 62. Support bracket 68 is mounted to block 38 and includes a recessed portion 70 in which the lever arm 62 is located. Support bracket 68 thus prevents lever arm 62 from bending or moving backwards when the tube clamps are under compressive loads and pushing against the pivot arm 56. Support bracket 68 also provides a location to support sensor circuit board 72. Lever arm 56 has an outwardly projecting tip 74 which would be disposed against the cam shaft 34 as shown in FIG. 6.

Lever arm 62 includes a sensor pin 76 which would interrupt the optical sensors on position sensor printed circuit board 72. In that regard, two optical sensors are located on circuit board 72 that detect the up or down position of the lever arm 62. As a result, it is possible to create control signals for the welding programming.

Instead of using an optical sensor other types of sensing/switch arrangements can be used.

In operation the components of the clamp locking mechanism 36 would initially be in the position shown in FIG. 5 where the tip 74 of pivot arm 56 is retracted and does not apply a force against the cam shaft. While in this position the lever arm 62 has moved to the base of the cam profile 78 in the track 40. Having lever arm 62 in this down position permits the pivot arm to be rotated to a position where tip 74 does not extend outwardly from block 38. The position of the lever arm 62 is detected by sensor 72 which detects the position of pin 76 to indicate that the handle 66 and lever arm 62 are in the retracted down position.

When it is desired to activate the clamp locking mechanism 36, handle 66 is rotated upwardly in a counterclockwise direction to the position shown in FIG. 4. Lever arm 62 rides against cam profile 78 cut into pivot arm 56 and urges pivot arm 56 to rotate clockwise against the force of leaf spring 60. The tip 74 of pivot arm 56 then projects outwardly beyond block 38 and pushes against the cam roller shaft 34 to lock it in place thereby preventing any lateral motion of the movable tube holder 12. As a result the clamp faces of tube holder 12 and tube holder 14 are kept flush together and prevent any fluid from being trapped when the tubes are loaded. Thus, the position of pivot arm 56 is controlled by the location of lever arm 62 against the angled cam profile 78. This results in a translation of rotational movement from about the X axis of lever arm 62 to about the Z axis of pivot arm 56.

The location of tip 74 is assured by the sensors 72 detecting the position of pin 76 when the lever arm 62 is in its up position shown in FIG. 4.

The various components of clamp locking mechanism 36 may thus be considered as having the following functions. When the clamp lock handle 66 is in the up position shown in FIG. 4, the tip 74 of the pivot arm 56 pushes the cam roller shaft 34 against the movable tube clamp in movable tube holder 12 locking it in place against the fixed tube clamp of tube holder 14.

The lever arm 62 functions to actuate the pivot arm 56 by following the angled cam profile 78 cut into the pivot arm 56.

The pivot arm 56 functions as a cam lock by having its tip 74 press against the cam roller shaft 34.

The pivot arm leaf spring 60 provides a spring force to keep the pivot arm 56 in the open retracted position shown in FIG. 5 when the lever arm 62 is moved to the open/unlocked position by being at the base of the cam profile 78.

Lever arm shaft 64 axially connects the lever arm 62 with the clamp lock handle 66. The shaft 64 is mounted by a hole bored into the linear cam roller guide block 38.

The clamp lock handle 66 controls the position of lever arm 62. The tube clamps of holders 12 and 14 are held together when the handle 66 is in the up position shown in FIG. 4. The tube clamps of holders 12,14 are unlocked and free to move when the handle 66 is in the down position of FIG. 5.

The clamp lock position sensor printed circuit board 72 supports two optical sensors that detect the up or down position of the lever arm 62 as a result of the lever arm sensor pin 76 interrupting the optical sensors.

The support bracket 68 prevents lever arm 62 from bending or moving backwards when the tube clamps of holders 12,14 are under compressive load and pushing against the tip 74 of pivot arm 56. In addition, the support bracket 68 provides a support for the sensor circuit board 72.

The linear guide roller guide block 38 provides a cam follower track for driving the movable tube holder 12 in the X or lateral direction.

Because of the provision of clamp locking mechanism 36 it is possible to use tubing T in device 10 to be of a wider range of thickness than would be possible where there is sole reliance on the spring 18 to provide a force to hold the clamp faces together as the tubing is compressed when the tube clamps are closed and latched. By adding the clamp locking mechanism 36, the clamps would be held together during tube loading in a manner which would allow the clamps to accommodate a wider range of tubing thickness.

What is claimed is:

1. In a device for welding plastic tubes comprising a first tube holder having first and second parallel tube holding areas, a second tube holder having first and second parallel tube holding areas which are alignable with said tube holding areas of said first tube holder whereby a first tube may be placed in the aligned first tube holding areas and a second tube may be placed in the aligned second tube holding areas, said first tube holder having a tube clamp for clamping each of the tubes in the respective tube holding areas, said second tube holder having a tube clamp for clamping each of the tubes in the respective tube holding areas whereby a fluid free area is created in each tube when said tube holders are in a loading station, one of said tube holders being laterally fixed and the other tube holder being laterally movable with respect to said fixed tube holder, and a spring mechanism urging said laterally movable tube holder toward said fixed tube holder while in said loading station, the improvement being in a clamp locking mechanism in said loading station to provide an action which supplements said spring mechanism to maintain said movable tube holder urged toward said fixed tube holder, wherein said clamp locking mechanism includes a pivot arm having a tip selectively imparting a force against said movable tube holder whereby said locking mechanism is in said locked position when said pivot arm tip imparts a force against said movable tube holder and said locking mechanism is in said unlocked position when said tip of said pivot arm does not impart a force against said movable tube holder, and a handle for selectively controlling the position of said tip.

2. The device of claim 1 wherein said clamp locking mechanism is manually movable to and from a locking position and an unlocking position.

3. The device of claim 1 wherein said pivot arm includes a cam profile having a locking location and an unlocking location, a lever arm mounted against said cam profile to dispose said tip selectively into said locking position and said unlocking position, and said lever arm being mounted to said handle whereby said handle controls the position of said lever arm.

4. The device of claim 3 including a spring member biased against said pivot arm to urge said pivot arm to said unlocking position.

5. The device of claim 4 including a guide block, and said pivot arm being mounted to a top surface of said guide block.

6. The device of claim 5 wherein said lever arm is mounted on one end of a shaft, said shaft being rotatably mounted to said guide block, and said handle being mounted to an opposite end of said shaft.

7. The device of claim 6 including a support bracket mounted to a side surface of said guide block, said support bracket having a recess, and said lever arm being mounted in said recess to be between said support bracket and said guide block whereby said recess confines and limits the movement of said lever arm.

8. The device of claim 7 including a sensor pin mounted on said lever arm, a sensor mounted to said support bracket to sense the location of said sensor pin, and said sensor thereby giving an indication of when said lever arm is disposed in said locking position and when said lever arm is disposed in said unlocking position.

9. The device of claim 8 wherein said sensor is an optical sensor, and said spring member being a leaf spring.

10. The device of claim 9 including cam structure for controlling the lateral position of said movable tube holder, said cam structure having a cam shaft, and said pivot arm tip imparting a force pushing against said movable tube holder by pushing against said cam shaft.

11. The device of claim 1 wherein said device has a stripping station in which said movable tube holder is laterally shifted away from said fixed tube holder.

12. The device of claim 1 wherein said clamp locking mechanism includes a pivot arm having a tip selectively imparting a force against said movable tube holder whereby said locking mechanism is in said locked position when said pivot arm tip imparts a force against said movable tube holder and said locking mechanism is in said unlocked position when said tip of said pivot arm does not impart a force against said moveable table holder,
wherein said pivot arm includes a cam profile having a locking location and an unlocking location, and a lever arm mounted against said cam profile to dispose said tip selectively into said locking position and said unlocking position.

13. The device of claim 12 including a spring member biased against said pivot arm to urge said pivot arm to said unlocking position.

14. The device of claim 13 including a guide block, and said pivot arm being mounted to a top surface of said guide block.

15. The device of claim 14 including a support bracket mounted to a side surface of said guide block, said support bracket having a recess, and said lever arm being mounted in said recess to be between said support bracket and said guide block whereby said recess confines and limits the movement of said lever arm.

16. The device of claim 15 including a sensor pin mounted on said lever arm, a sensor mounted to said support bracket to sense the location of said sensor pin, and said sensor thereby giving an indication of when said lever arm is disposed in said locking position and when said lever arm is disposed in said unlocking position.

17. The device of claim 16 wherein said sensor is an optical sensor, and said spring member being a leaf spring.

18. The device of claim 17 including cam structure for controlling the lateral position of said movable tube holder, said cam structure having a cam shaft, and said pivot arm tip imparting a force pushing against said movable tube holder by pushing against said cam shaft.

19. An apparatus for welding plastic tubes comprising:
a first tube holder having first and second parallel tube holding areas;
a first tube clamp for clamping the tubes in the respective tube holding areas;
a second tube holder having first and second parallel tube holding areas,
a second tube clamp for clamping the tubes in the respective tube holding areas;
  wherein the second parallel tube holding areas are alignable with the first tube holder holding areas;
the first tube holders being laterally fixed and the second tube holder being laterally movable,
a spring mechanism;
a clamp locking mechanism comprising a pivot arm having a tip to maintain the second tube holder in position with respect to the first tube holder, and
a handle for selectively controlling the position of said tip wherein the clamp locking mechanism selectively imparts a force against the second tube holder; and
  wherein the clamp locking mechanism is in a locked position when the pivot arm tip imparts a force against the second movable tube holder and the locking mechanism is in an unlocked position when the pivot arm tip is not imparting the force against the second tube holder.

* * * * *